United States Patent
Sexton et al.

(10) Patent No.: US 7,688,776 B2
(45) Date of Patent: Mar. 30, 2010

(54) TIME-DIVISION MULTIPLEX ARBITRATION WITH FRACTIONAL ALLOCATION

(75) Inventors: William J. Sexton, The Colony, TX (US); Alan S. Hearn, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 579 days.

(21) Appl. No.: 11/555,503

(22) Filed: Nov. 1, 2006

(65) Prior Publication Data

US 2008/0101399 A1  May 1, 2008

(51) Int. Cl.
*H04B 7/212* (2006.01)
(52) U.S. Cl. .................. 370/322; 370/337; 370/348; 370/449
(58) Field of Classification Search ............... None
See application file for complete search history.

(56) References Cited

U.S. PATENT DOCUMENTS

| | | | | |
|---|---|---|---|---|
| 6,842,437 B1 * | 1/2005 | Heath | ............... | 370/322 |
| 7,369,491 B1 * | 5/2008 | Beshai et al. | ............... | 370/230 |
| 7,443,790 B2 * | 10/2008 | Aicklen et al. | ............... | 370/228 |
| 2003/0067653 A1 * | 4/2003 | Aicklen et al. | ............... | 359/139 |
| 2003/0095562 A1 * | 5/2003 | Liu et al. | ............... | 370/442 |
| 2005/0036505 A1 * | 2/2005 | Frei et al. | ............... | 370/442 |
| 2006/0147208 A1 * | 7/2006 | Aicklen et al. | ............... | 398/54 |
| 2008/0101399 A1 * | 5/2008 | Sexton et al. | ............... | 370/461 |

\* cited by examiner

*Primary Examiner*—Salman Ahmed
*Assistant Examiner*—Faiyazkhan Ghafoerkhan
(74) *Attorney, Agent, or Firm*—Charles A. Brill; Wade James Brady, III; Frederick J. Telecky, Jr.

(57) ABSTRACT

Disclosed embodiments reveal techniques for efficiently allocating time slots in a time-division multiplex (TDM) cycle among multiple channels of varying size, particularly when the channels do not all desire an integer number of time slots. TDM cycles can only allocate an integer number of time slots to each channel. So when at least one channel does not desire an integer number of time slots, then the disclosed embodiments allocate a number of time slots equal to the integer portion to each channel, rolling any fractional remainder over to the next cycle. This cumulative cyclical fractional summing process efficiently allocates time slots among the channels, allowing the average allocation per cycle to approach the true non-integer desired amount over time.

29 Claims, 5 Drawing Sheets

| TDM CYCLE NUMBER | ALLOCATION REMAINDER | | DESIRED ALLOCATION | | TOTAL ALLOCATION | TDM CYCLE ALLOCATION |
|---|---|---|---|---|---|---|
| 1 | 0.000 | + | 2.643 | = | 2.643 | 2 |
| 2 | 0.643 | + | 2.643 | = | 3.286 | 3 |
| 3 | 0.286 | + | 2.643 | = | 2.929 | 2 |
| 4 | 0.929 | + | 2.643 | = | 3.572 | 3 |
| 5 | 0.572 | + | 2.643 | = | 3.215 | 3 |
| 6 | 0.215 | + | 2.643 | = | 2.858 | 2 |
| 7 | 0.858 | + | 2.643 | = | 3.501 | 3 |
| 8 | 0.501 | + | 2.643 | = | 3.144 | 3 |
| 9 | 0.144 | + | 2.643 | = | 2.787 | 2 |
| 10 | 0.787 | + | 2.643 | = | 3.430 | 3 |
| 11 | 0.430 | + | 2.643 | = | 3.073 | 3 |
| 12 | 0.073 | + | 2.643 | = | 2.716 | 2 |
| 13 | 0.716 | + | 2.643 | = | 3.359 | 3 |
| ⋮ | ⋮ | ⋮ | ⋮ | ⋮ | ⋮ | ⋮ |

| TDM CYCLE NUMBER | ALLOCATION REMAINDER | | DESIRED ALLOCATION | | TOTAL ALLOCATION | TDM CYCLE ALLOCATION |
|---|---|---|---|---|---|---|
| 1 | 0.000 | + | 2.643 | = | 2.643 | 2 |
| 2 | 0.643 | + | 2.643 | = | 3.286 | 3 |
| 3 | 0.286 | + | 2.643 | = | 2.929 | 2 |
| 4 | 0.929 | + | 2.643 | = | 3.572 | 3 |
| 5 | 0.572 | + | 2.643 | = | 3.215 | 3 |
| 6 | 0.215 | + | 2.643 | = | 2.858 | 2 |
| 7 | 0.858 | + | 2.643 | = | 3.501 | 3 |
| 8 | 0.501 | + | 2.643 | = | 3.144 | 3 |
| 9 | 0.144 | + | 2.643 | = | 2.787 | 2 |
| 10 | 0.787 | + | 2.643 | = | 3.430 | 3 |
| 11 | 0.430 | + | 2.643 | = | 3.073 | 3 |
| 12 | 0.073 | + | 2.643 | = | 2.716 | 2 |
| 13 | 0.716 | + | 2.643 | = | 3.359 | 3 |
| ⋮ | ⋮ | ⋮ | ⋮ | ⋮ | ⋮ | ⋮ |

FIG. 6

| TDM CYCLE | CHANNEL | ALLOCATION REMAINDER | | STANDARD DESIRED ALLOCATION | | TOTAL DESIRED ALLOCATION | | ACTUAL ALLOCATION (INTEGER PORTION) | | FRACTIONAL LEFTOVER | TDM WHEEL DIAGRAM |
|---|---|---|---|---|---|---|---|---|---|---|---|
| 1 | A | 0 | + | 1.0 | = | 1.0 | – | 1 | = | 0 |  CYCLE 1 ALLOCATION — 901 |
|   | B | 0 | + | 2.5 | = | 2.5 | – | 2 | = | 0.5 | |
|   | C | 0 | + | 4.8 | = | 4.8 | – | 4 | = | 0.8 | |
|   | D | 0 | + | 1.3 | = | 1.3 | – | 1 | = | 0.3 | |
| 2 | A | 0 | + | 1.0 | = | 1.0 | – | 1 | = | 0 |  CYCLE 2 ALLOCATION — 911 |
|   | B | 0.5 | + | 2.5 | = | 3.0 | – | 3 | = | 0 | |
|   | C | 0.8 | + | 4.8 | = | 5.6 | – | 5 | = | 0.6 | |
|   | D | 0.3 | + | 1.3 | = | 1.6 | – | 1 | = | 0.6 | |
| 3 | A | 0 | + | 1.0 | = | 1.0 | – | 1 | = | 0 |  921 CYCLE 3 ALLOCATION |
|   | B | 0 | + | 2.5 | = | 2.5 | – | 2 | = | 0.5 | |
|   | C | 0.6 | + | 4.8 | = | 5.4 | – | 5 | = | 0.4 | |
|   | D | 0.6 | + | 1.3 | = | 1.9 | – | 1 | = | 0.9 | |
| 4 | A | 0 | + | 1.0 | = | 1.0 | – | 1 | = | 0 |  931 CYCLE 4 ALLOCATION |
|   | B | 0.5 | + | 2.5 | = | 3.0 | – | 3 | = | 0 | |
|   | C | 0.4 | + | 4.8 | = | 5.2 | – | 5 | = | 0.2 | |
|   | D | 0.9 | + | 1.3 | = | 2.2 | – | 2 | = | 0.2 | |
| ... | ... | ... | | ... | | ... | | ... | | ... | ... |

FIG. 7

| TDM CYCLE | CHANNEL | ALLOCATION REMAINDER | | STANDARD DESIRED ALLOCATION | | TOTAL DESIRED ALLOCATION | | ACTUAL ALLOCATION (INTEGER PORTION) | FRACTIONAL LEFTOVER | PORTION OF TDM CYCLE ASSIGNED |
|---|---|---|---|---|---|---|---|---|---|---|
| 1 | A | 0 | + | 2.00 | = | 2.00 | – | 2 | 0 | 2/5 |
|   | B | 0 | + | 0.83 | = | 0.83 | – | 0 | 0.83 | – |
|   | C | 0 | + | 3.24 | = | 3.24 | – | 3 | 0.24 | 3/5 |
|   | D | 0 | + | 0.50 | = | 0.50 | – | 0 | 0.50 | – |
| 2 | A | 0 | + | 2.00 | = | 2.00 | – | 2 | 0 | 2/7 |
|   | B | 0.83 | + | 0.83 | = | 1.66 | – | 1 | 0.66 | 1/7 |
|   | C | 0.24 | + | 3.24 | = | 3.48 | – | 3 | 0.48 | 3/7 |
|   | D | 0.50 | + | 0.50 | = | 1.00 | – | 1 | 0 | 1/7 |
| 3 | A | 0 | + | 2.00 | = | 2.00 | – | 2 | 0 | 2/6 |
|   | B | 0.66 | + | 0.83 | = | 1.49 | – | 1 | 0.49 | 1/6 |
|   | C | 0.48 | + | 3.24 | = | 3.72 | – | 3 | 0.72 | 3/6 |
|   | D | 0 | + | 0.50 | = | 0.50 | – | 0 | 0.50 | – |
| ... | ... | ... | | ... | | ... | | ... | ... | ... |

TIME-DIVISION MULTIPLEX ARBITRATION WITH FRACTIONAL ALLOCATION

FIELD OF THE INVENTION

The disclosed embodiments relate generally to the allocation of time-division multiplex cycles among a variety of input source channels, so that bandwidth can be effectively utilized. More specifically, disclosed embodiments herein relate to methods for structuring a common system memory access for use with Digital Micromirror Devices so that time-division multiplex cycles can be efficiently allocated for source channels that may vary in size.

BACKGROUND OF THE INVENTION

Time-division multiplexing ("TDM") is a popular technique for transmitting data from multiple input source channels. Using a TDM approach, several slower speed data streams from separate channels are combined into a single high-speed TDM data stream. This is accomplished by separating the data stream from each channel into many discrete segments, each having a very short duration, and assigning segments to the single high-speed TDM data stream in a rotating, repeating sequence. In essence, the segments from each channel are interleaved, with each input channel having access to the entire bandwidth of the high-speed TDM data stream channel during its assigned time interval. A first-in-first-out (FIFO) approach is generally utilized, with buffer storage allowing each individual slower speed data stream to be reassembled into the original data stream. In this way, the composite high-speed TDM data stream channel is able to efficiently transmit data from all of the various input channels.

Based upon the amount of data each channel is transmitting/receiving (i.e. each channel's bandwidth), the TDM cycle is divided up among the various channels, assigning each channel a number of time slots per cycle based on its proportionate bandwidth size. Since each TDM cycle represents a fixed amount of time, the number of time slots assigned to each channel represents the portion of each TDM cycle time interval that each channel may access the high-speed data stream (also referenced as the TDM data stream). So the proportionate size of each channel's bandwidth would typically be used to determine how to divide TDM cycles among a variety of channels. A TDM cycle may be set as any length of time, based on the specific needs of the system. Regardless of the actual length of time of a TDM cycle, each channel would generally receive a proportionate share of the TDM cycle time based on bandwidth size.

Figure 1:
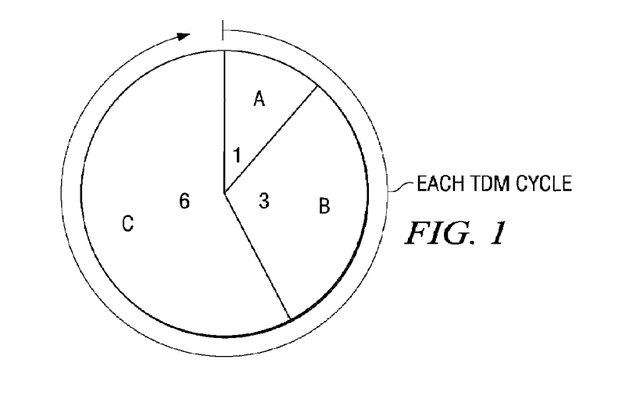
FIG. 1 is an exemplary TDM wheel diagram illustrating the manner in which a conventional TDM process allocates time slots.

Such a TDM cycle approach can be illustrated using a TDM wheel diagram. FIG. 1 shows a typical exemplary TDM wheel diagram with three input source channels. By way of illustrative example, the high-speed TDM data stream for FIG. 1 could be capable of transmitting data at 10 kbps. In keeping with the TDM wheel diagram of FIG. 1, Channel A would transmit 1 kbps, Channel B would transmit 3 kbps, and Channel C would transmit 6 kbps. Thus, Channel A might be assigned 1 time slot, corresponding to $1/10^{th}$ of the TDM cycle, Channel B might be assigned 3 time slots, corresponding to $3/10$ths of the TDM cycle, and Channel C might be assigned 6 time slots, corresponding to $6/10^{th}$ of the TDM cycle. In this way, the TDM cycle (regardless of length) would be divided among the channels based on the proportionate value of each channel's bandwidth.

So for a 1 second TDM cycle, Channel A would access the high speed data stream for $1/10^{th}$ of a second, transmitting or receiving 1 kbit of data ($1/10$s*10 kbps=1 kbit); Channel B would access the high speed data stream for $3/10$ of a second, transmitting 3 kbits of data ($3/10$ s*10 kbps=3 kbits); and Channel C would access the high speed data stream for $6/10^{th}$ of a second, transmitting 6 kbits of data ($6/10$ s*10 kbps=6 kbits). If on the other hand the TDM cycle were set as 0.1 seconds in duration, then each of the three channels would still receive the same fractional amount of each TDM cycle, but it would take ten cycles to transmit/receive the same amount of information as a single one second TDM cycle (such that over a given period of time, the same amount of data would be transmitted for each channel). Accordingly, rather than consider the bits transmitted/received by each channel, examples will hereinafter simply reference the number of time slots allocated to each channel per TDM cycle as a way of discussing the proportional allocation of time between channels for accessing the high-speed TDM data stream each TDM cycle.

Generally, the allocation of time slots among the various channels would be proportional to the size of each channel's bandwidth with respect to the total bandwidth all channels desire. Each time slot generally represents an amount of bandwidth equal to some integer multiple of system burst size. Generally, to keep the required TDM data buffers (for the first-in-first-out approach) to a minimum, it is desirable to set the burst size as small as possible. Accordingly, the burst size tends to be set to the smallest burst that allows stall-free access to the high-speed data stream (for example, the system memory), basically allowing the high-speed data stream to run at peak bandwidth. In addition, TDM cycle length is generally minimized in order to reduce the size of the FIFO buffers (thereby reducing cost).

So in the example of FIG. 1, Channel A's bandwidth would be equal to the system's burst size, such that Channel A's standard desired allocation would be one time slot. Channel B's bandwidth would be three times that of Channel A, while Channel C's bandwidth would be six times that of Channel A. Thus, Channel A would desire and be allocated one time slot per TDM cycle, Channel B would desire and be allocated three time slots per cycle, and Channel C would desire and be allocated six time slots per cycle. Each cycle, one time slot of the high-speed TDM data stream would carry a segment from Channel A, followed by three time slots carrying a segment of Channel B's data, and six time slots carrying a segment of Channel C's data. In other words, each cycle around the TDM wheel, Channel A's data transmission (via the high-speed TDM data stream) would be followed by Channel B which would be followed by Channel C, and Channel C's transmission/reception time would last twice as long as that of Channel B, which would last three times as long as Channel A's. The TDM cycle repeats, thus interleaving the data streams from the three input source channels based on this cyclical time allocation procedure.

TDM cycles are often used to allocate bandwidth for telephone and internet transmissions, but they may be used any time multiple, slower speed channels are combined for transmission/reception using a single high-speed TDM data stream. The specific technique disclosed below would also typically apply when multiple sources seek to access memory. For example, the disclosed embodiments operating in a Digital Micromirror Device ("DMD") might allow multiple components of the DMD system to access the system memory. In this situation, the TDM cycle would allocate memory access based upon the same sort of rotating, repeating time sequence as described above. It should also be noted that any reference to a channel transmitting data (or a data transmission) is intended to broadly refer to transmitting/ receiving (transmission/reception); channels may read and/or write data within a TDM approach.

Conventional TDM cycles operate fairly effectively when each of the input source channels desire an integer number of time slots (as when each channel's bandwidth is an integer multiple of the system's burst size, for example). When the input source channels are not all integer multiples, however, conventional TDM cycle allocation tends to become inefficient. In these circumstances, an improved TDM cycle allocation technique is needed so that fractional elements can be efficiently allocated. After all, bandwidth is a valuable commodity, determining the cost of a system and the speed of access available, and so it should be efficiently utilized.

SUMMARY OF THE INVENTION

Conventional TDM cycles may not make efficient use of bandwidth in instances where one or more channels desire a non-integer number of time slots. By its nature, a TDM cycle can only assign an integer number of time slots to any channel (since time slots are generally based on the burst size at which the system can transmit at peak bandwidth, which is a fixed parameter of the system). So only a whole integer number of time slots may actually be assigned to channels in a TDM cycle, regardless of the actual amount of bandwidth the channel wants.

Typically, the desired allocation of time slots for each channel would be determined based on system needs. By way of example, the desired allocation for each channel could be determined by dividing each channel's bandwidth by an integer multiple of the burst size of the system. Alternatively, the number of time slots that each channel desires could be normalized, with for example, one channel's desired allocation being set as an integer number (such that each TDM cycle, that channel would receive bandwidth that is some integer multiple of the burst size), with all other channels' desired allocations being set in proportion to the relative size of their bandwidths. Regardless, each channel's desired allocation of time slots would be proportional to its bandwidth need with respect to the total bandwidth needed for all channels. So depending upon the needs of the system, there may be instances when one or more of the channels would not desire an integer number of time slots.

A conventional TDM cycle can be fairly efficient at allocating time slots among multiple channels if the channels each desire an exact integer number of time slots. If however, one or more of the source channels are not sized so that they desire an exact integer number of time slots, then a conventional TDM cycle makes inefficient use of the bandwidth of the high-speed data stream. Since only an integer number of time slots can be assigned, a conventional TDM cycle would assign the smallest integer number of time slots that is sufficiently large to handle all of that channel's data stream segment per cycle (i.e. the integer number of time slots directly above the actual, non-integer desired allocation of time slots for the channel). While such a non-integer channel might use much of those assigned time slots, there would be a fractional excess assigned to the channel that would essentially be wasted, resulting in less efficient use of the available bandwidth (i.e. there would be time allocated to a channel when it would have no data to broadcast, resulting in dead air space).

Figure 2:
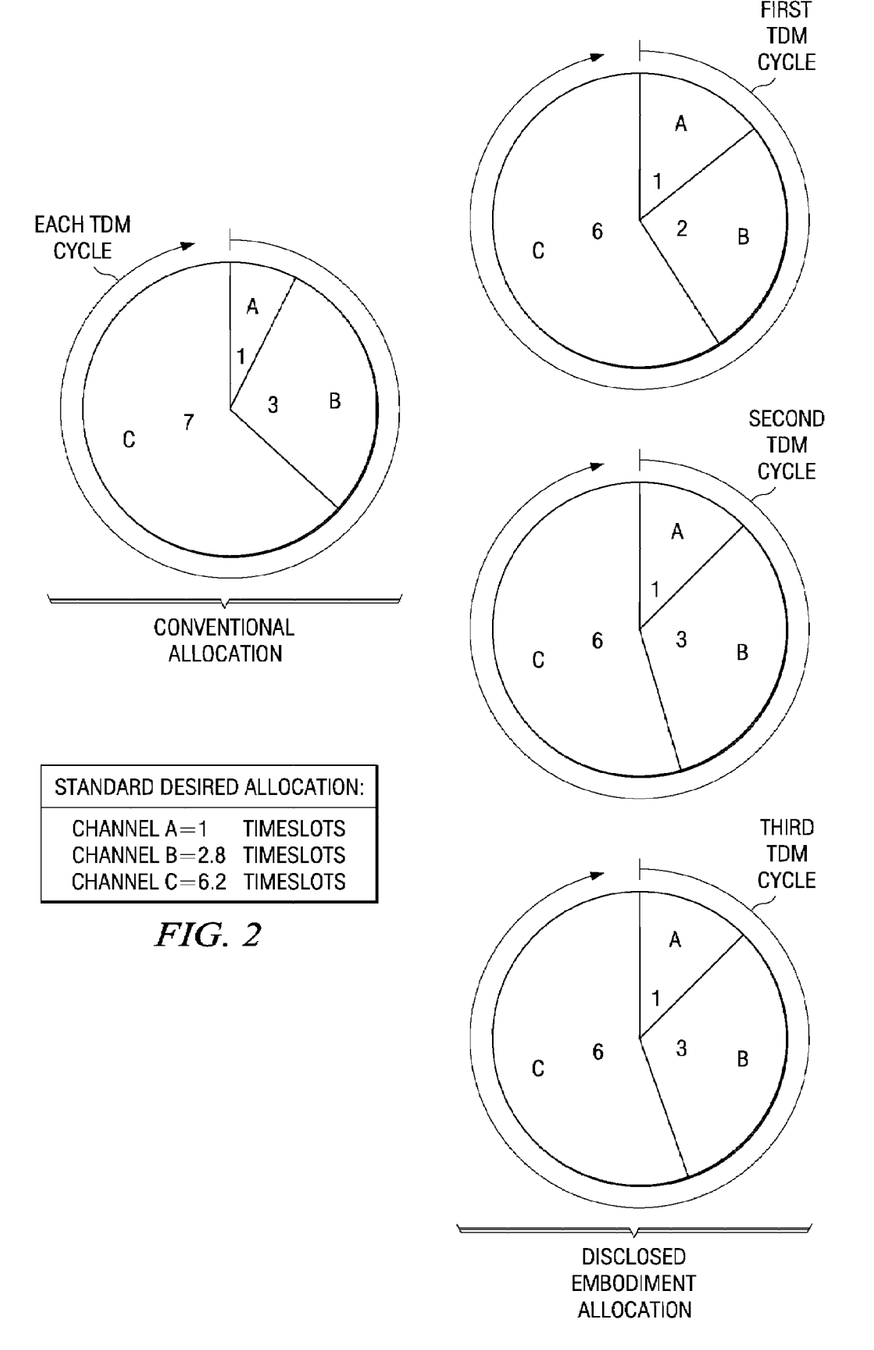
FIG. 2 provides a set of exemplary TDM wheel diagrams that assist in illustrating the difference in the way that a conventional TDM cycle allocates time slots in comparison to the more efficient TDM cycles disclosed herein, when some channels desire a non-integer number of time slots.

This efficiency problem, often experienced by conventional TDM cycles, may be better understood by considering the exemplary TDM wheel diagrams shown in FIG. 2 (with regard to three input channels). In FIG. 2, Channel A still desires one time slot. Channel B, however, desires 2.8 time slots, with Channel C desiring 6.2 time slots. Thus, Channels B and C do not desire an integer number of time slots. Since TDM cycles can only assign time slots that are integer numbers, however, a conventional TDM cycle would assign Channel A one time slot, Channel B three time slots, and Channel C seven time slots (as shown in the TDM wheel diagram of FIG. 2 for conventional allocation). Channels B and C would not actually make use of the entirety of the time slots allocated to them using the conventional approach, however, resulting in wasted bandwidth.

When multiple channels are involved, especially in the memory access context of a digital micromirror device, it is fairly common for there to be channels whose desired allocation of time slots would not be an integer number. The disclosed embodiments provide an alternative method for assigning TDM time slots in order to more efficiently allocate time slots among multiple channels. This new method is especially useful in contexts such as digital micromirror device system memory access, which typically involves multiple channels of varying sizes, such that channels often may not involve integer multiples.

The disclosed embodiments alter the manner of allocation of time slots to provide for a more efficient use of bandwidth. Rather than assigning each channel a number of time slots corresponding to the smallest integer number sufficiently large to handle all of that channel's data stream per cycle (guaranteeing inefficiency due to wasted bandwidth if the desired allocation has any fractional amount), each channel would generally be assigned a number of time slots corresponding to the integer portion of the desired allocation. In other words, each channel is assigned a number of time slots corresponding to the integer number directly less than or equal to the actual desired allocation. This type of assignment means that any fractional amount for each channel would be left over after the disclosed TDM cycle allocates time slots. These fractional leftovers can then be accumulated cyclically for each channel until the fractional amounts reach the level of a full time slot, at which time an additional time slot may be assigned to that specific channel in order to account for the cumulative fractional portion.

An example may make the disclosed process clearer. Referencing FIG. 2 again, Channel A desires one time slot, Channel B desires 2.8 time slots, and Channel C desires 6.2 time slots per TDM cycle. Using the TDM process disclosed below, Channel A would actually be assigned one time slot for the first cycle; Channel B would be assigned two time slots, while Channel C would be assigned six time slots. This allocation can be seen in FIG. 2 by referring to the TDM wheel diagram of the disclosed embodiment for the first TDM cycle. Both Channels B and C would have fractional leftovers (of 0.8 and 0.2 respectively).

The next TDM cycle, Channel A still would desire one time slot. Channel B, however, would now desire 3.6 time slots (its standard 2.8 plus the 0.8 fractional leftover from the first cycle), with Channel C desiring 6.4 time slots (its standard 6.2 plus the leftover 0.2 from the first cycle). Consequently, on this second TDM cycle, Channel A would actually be assigned one time slot, Channel B would be assigned three time slots, and Channel C would be assigned six time slots. The TDM wheel diagram of FIG. 2 for the second cycle of the disclosed embodiment illustrates this allocation. Channel B would now have a fractional leftover of 0.6 (its desired 3.6 minus the 3 slots actually allotted), while Channel C would now have a fractional leftover of 0.4 (its desired 6.4 minus the 6 time slots actually allotted).

The Third TDM cycle, Channel A would desire its standard one time slot. Channel B would desire 3.4 time slots (based on its standard 2.8 plus 0.6 fractional leftover), and Channel C would desire 6.6 time slots (based on its standard 6.2 plus the 0.4 cumulative fractional leftover). So for the third TDM cycle, one time slot would be allocated to Channel A, three time slots would be allocated to Channel B (with a 0.4 fractional leftover), and six time slots would be allocated to Channel C (with a 0.6 fractional leftover). This cyclical process would continue, cumulating the fractional leftover for each channel after each TDM cycle and summing it with the standard desired allocation for each channel to determine the actual number of time slots to be assigned to each channel per TDM cycle based on the integer portion of this sum. This fractional allocation approach may provide for a more efficient use of the available bandwidth, since there is no wasted bandwidth assignment for non-integer channel sources. In this way, the TDM cycle of the disclosed embodiments can allocate time slots to make effective use of the high-speed data stream bandwidth.

Conventional TDM cycles may also be inefficient if there is a great disparity in the size of the channels' bandwidth (due to their inability to address fractional desired allocations). For example, if there are two channels X and Y, and Channel X has a bandwidth that is 250 times that of Channel Y, then in a conventional TDM cycle, Channel X might be assigned 250 time slots, with Channel Y being assigned one time slot per TDM cycle. This large disparity in the size of Channel X with respect to Channel Y would require a large FIFO buffer, however, slowing the data transmission and increasing the cost of the system. Using the disclosed embodiments, Channel X's standard desired allocation could be set to 1 time slot, while Channel Y's standard desired allocation could be set to 1/250 time slots. Then, Channel X would receive the entire bandwidth of the high-speed data stream for the first 249 TDM cycles (since Channel X's desired allocation would be one, while Channel Y's standard desired allocation would be a fraction, resulting in an actual allocation of zero time slots to Channel Y for the first 249 TDM cycles).

Each of those first 249 cycles, the fractional portion of Channel Y's standard desired allocation (1/250) would be summed, until on the 250th cycle, Channel Y would have accumulated enough fractional remainders so that its desired allocation would be one time slot. Thus, on the 250th cycle, Channel X and Channel Y would each receive one time slot. This process would repeat again every 250 TDM cycles. By defining the standard desired allocation for each of these channels in this manner (where one of the channels desires a fractional number of time slots) and using a TDM approach with fractional allocation, the disclosed embodiments may more efficiently address channels with widely varying bandwidth.

So the disclosed TDM process operates more efficiently by allocating to each channel an integer number of time slots less than or equal to the desired number of time slots (typically the integer portion of the desired allocation). This allocation prevents excess bandwidth from being assigned to any channel that does not desire an integer number of time slots. The fractional remainder for non-integer channels must also be addressed, however. Fractional leftovers for each channel may be resolved by accumulating fractional time slots for each non-integer channel until an additional whole time slot has been accumulated, and then allotting an additional time slot to that channel for that cycle in order to account for the summed fractional leftovers.

BRIEF DESCRIPTION OF THE DRAWINGS

Reference is made to the figures below.

DETAILED DESCRIPTION OF THE EMBODIMENTS

The processes disclosed below provide a more efficient manner for allocating time slots within a TDM cycle among multiple source channels. These processes are particularly effective when allocating time slots among multiple channels of varying size, especially when one or more of the multiple channels do not desire an integer number of time slots (as for example, when a channel's bandwidth is not an integer multiple of the system's burst size or when the disparity in the size of the channels causes a channel to have its standard desired allocation defined as a fraction). While the disclosed embodiments are often described in terms of Digital Micromirror Devices (specifically providing multiple channels access to the system memory), these techniques have broader applications and could be employed any time a plurality of slower speed channels interacts with a high-speed TDM data stream. Uses could also include, by way of an illustrative, non-exhaustive list, TDM approaches for phone, Internet, and/or multi-media data streams. The term "high-speed TDM data stream" (or "high-speed data stream" or "TDM data stream") is a broad and inclusive one referring to any physical element that multiple, slower speed channels may access, including by way of example an output data transmission channel or memory storage.

Conventional TDM cycles tend to become inefficient when dealing with multiple input channels of varying size. This inefficiency may arise due to the interplay of two related facts: (1) only a whole integer number of time slots can be allocated to each channel per TDM cycle, and (2) the number of time slots each channel desires in order to effectively transmit/receive its data may not be an integer number.

Oftentimes, when multiple channels of varying size must be accommodated, the number of time slots each channel desires per cycle will not be an integer number. This may arise because the standard desired allocation of time slots for each channel generally relates to the optimum burst size (generally based on the minimum, zero-overhead burst length) of the system memory (high-speed data stream) and the channel's bandwidth. So depending upon the specific system parameters, one or more channels may not desire an integer number of time slots. This is problematic, since only whole integer numbers of time slots can actually be assigned to each channel per TDM cycle (as the burst size of the system is a fixed parameter that defines the smallest potential allocation unit). Accordingly, inefficiency may be introduced into the TDM cycle's allocation of bandwidth. The disclosed methods address this problem by assigning an integer number of time slots less than or equal to the actual desired number of time slots (typically the integer portion of the desired allocation of time slots) and efficiently managing any fractional remainder in order to maximize bandwidth use while balancing the needs of the multiple channels.

Figure 3:
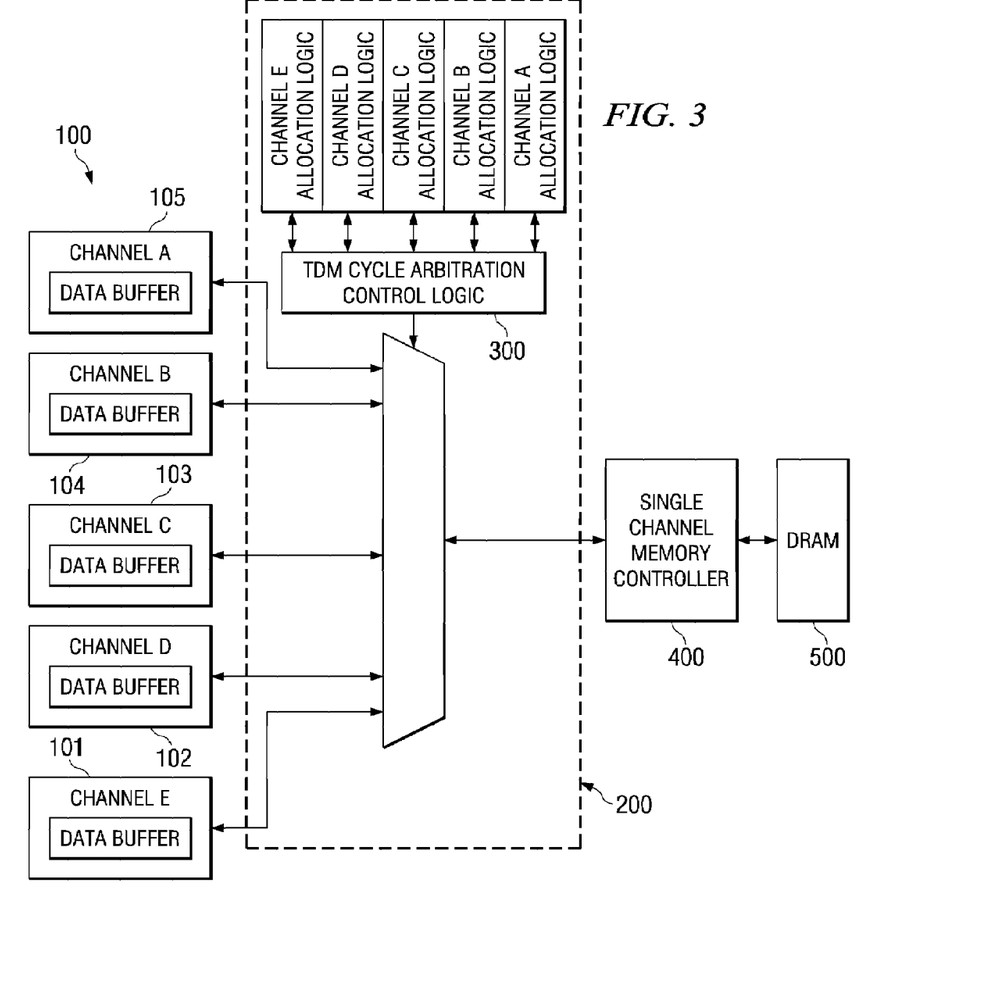
FIG. 3 is a diagram illustrating the functional interaction between elements, allowing five exemplary source channels to access DRAM memory (as in a Digital Micromirror Device) using TDM arbitration with fractional allocation.

FIG. 3 illustrates generally the manner in which the various component parts of such a disclosed TDM cycle management system would interact to allow multiple elements with channels of varying bandwidth size to access a single DRAM system memory element, in a DMD system for example. The DRAM of this example represents the single high-speed TDM data stream that is being accessed by the multiple, slower speed channels. An exemplary DMD system might have five channels A through E (101-105) that need to access the DRAM 500. In order to implement a time-division multiplex approach, each of the channels 100 would flow through a router 200. The router 200 would include a TDM cycle arbitration controller 300 that would provide the TDM control logic for each channel. The TDM cycle arbitration controller 300 would set the desired allocation of time slots for each channel based upon programmable allocation logic criteria. Only an integer number of time slots can actually be allocated to a channel, however, so if a channel would have a fractional remainder, the TDM cycle arbitration controller 300 would need further direction.

In that case, using the disclosed methods, the TDM cycle arbitration controller 300 would allocate a number of time slots equal to the integer portion of the desired allocation to each channel, and would accumulate the fractional remainder for each channel across multiple TDM cycles until that fractional sum reached or exceeded a full time slot. Once the accumulated fractional sum for a channel was greater than or equal to a whole time slot, the TDM cycle arbitration controller 300 would allocate an additional time slot to that channel. Using the TDM cycle allocation logic programmed into the TDM cycle arbitration controller 300, the router 200 would interleave the channels 101-105 on a rotating, repeating basis (for example, A, B, C, D, E, A, B, C, D, E, A, B, . . . ), assigning the appropriate number of time slots for each channel 100 per cycle. The Single Channel Memory Controller 400 would then grant access to the DRAM memory 500 based upon this TDM cycle, typically using a first-in-first-out protocol.

The functional elements set forth in the example of FIG. 3 are merely illustrative, providing an example of one set of elements that could provide the disclosed TDM arbitration with fractional allocation within a DMD system. A person skilled in the art field will appreciate that other elements could be employed to accomplish the disclosed TDM techniques. Other systems which would implement the disclosed TDM techniques are included within the scope of the disclosed embodiments. In addition, the disclosed embodiments are not limited to use accessing the system memory, but have broader applications.

Figure 4:
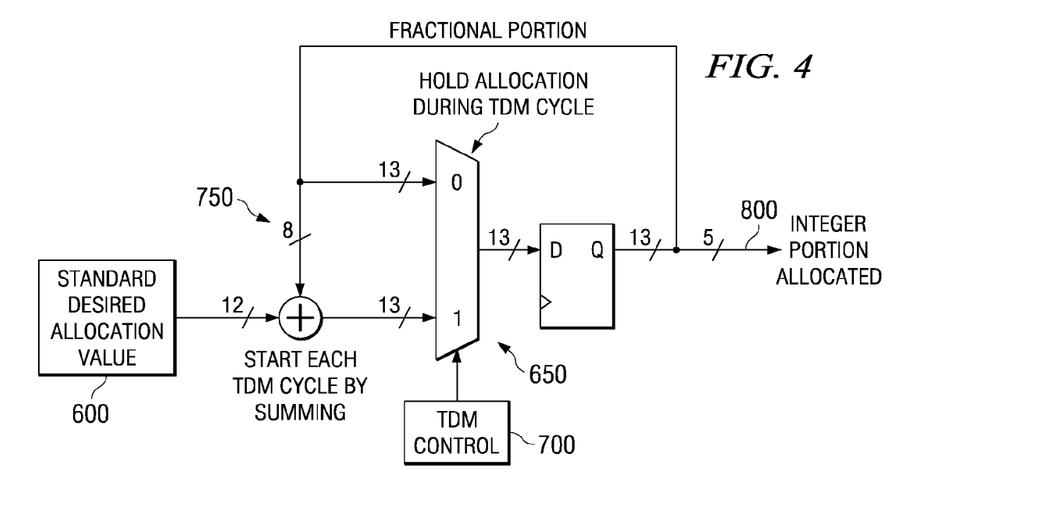
FIG. 4 is a logic diagram illustrating an example of a disclosed channel allocation function for one of the multiple channel input sources.

The logic flow diagram of FIG. 4 provides additional details regarding the disclosed TDM techniques implemented by the sorts of elements shown in FIG. 3. FIG. 4 illustrates logically how the disclosed TDM cycle allocates time slots to one of a plurality of channels. The standard desired allocation value 600 for a particular channel would be set by program software (typically within the TDM cycle arbitration controller). Any unaccounted for fractional portion 750 left over from the previous cycle would then be added to this standard desired allocation value 600 at the beginning of each TDM cycle 650 by the TDM controller 700, in order to determine the total desired allocation. For the first TDM cycle, the fractional portion 750 would be zero, since there would be no previous cycle that could result in a fractional remainder. So in this example, the fractional remainder 750 would be initialized to zero before the first cycle. Finally, the integer portion 800 of the total desired allocation would be used to determine the number of time slots to allocate to the channel, while the fractional portion 750 would be added to the standard desired allocation value 600 for the next TDM cycle. The channel would then access the high-speed TDM data stream based on the time slots allocated to it each cycle (determining the portion of the TDM cycle time allotted to the channel). This process would occur for each channel in the system, and the cycle would continue indefinitely.

Figure 5:
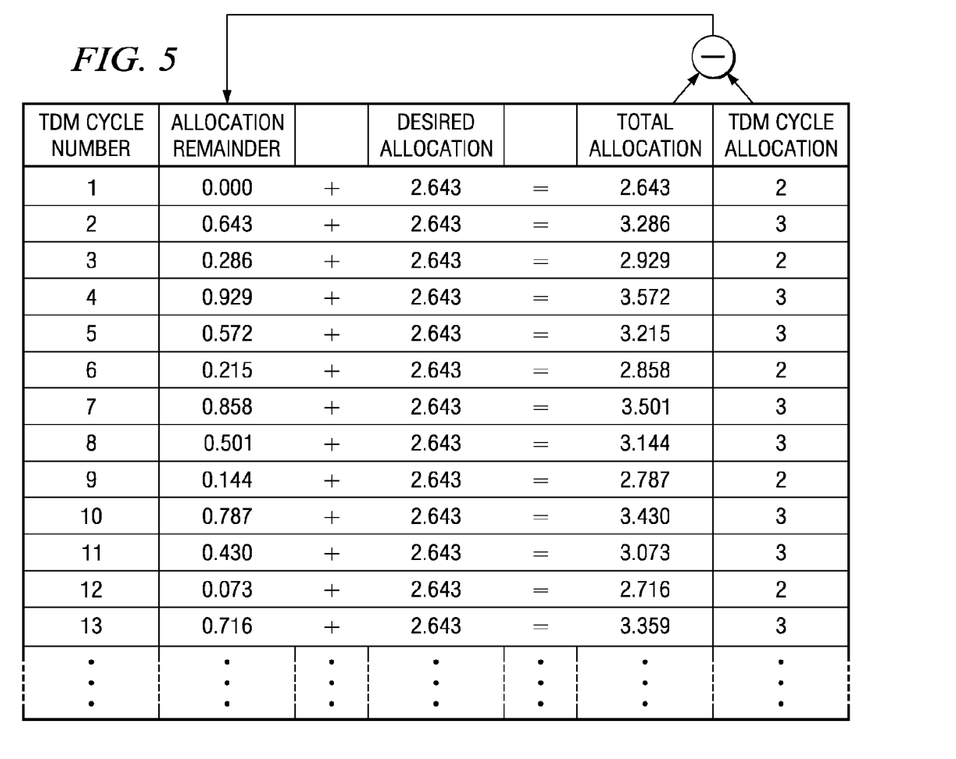
FIG. 5 is an exemplary chart illustrating a typical disclosed TDM cycle allocation of time slots for one channel in a multiple channel system where there is a fractional leftover.

FIG. 5 illustrates this same process using a numeric table diagram that provides an example of time slot allocation for the first thirteen TDM cycles for one out of a plurality of input source channels. The specific channel in this example desires 2.643 time slots per cycle, and initially the allocation remainder would be set to zero (since the first cycle can have no fractional remainder). By adding the allocation remainder from the previous cycle to the standard desired allocation, the total desired allocation can be determined for each cycle. A TDM cycle can only allocate an integer number of time slots, however. So, the channel would be assigned a number of time slots equal to the integer portion of the total desired allocation for actual allocation this cycle, and any fractional leftover would become the next cycle's allocation remainder (to be added to the next cycle's standard desired allocation).

As FIG. 5 illustrates, the actual number of time slots allocated to this exemplary channel for a given cycle would be either two or three (depending on the amount of the fractional leftover from the previous cycle). In other words, the actual allocation of time slots for this exemplary channel would vary between the two integer numbers that bracket the standard desired allocation. This process would continue indefinitely, so long as the input source channels to the system remain constant. By alternating between an allocation of two and three time slots per cycle, the process hones in on the standard desired allocation, using an averaging technique in order to approach the desired 2.643 allocation per cycle over time. The fractional technique demonstrated in FIG. 5 shows that the process essentially repeats after the fractional leftover (or allocation remainder) reaches zero. So in the specific example shown in FIG. 5, the process would repeat after 1000 cycles, at which point the average time slot allocation to this channel would equal the standard desired allocation.

Figure 6:
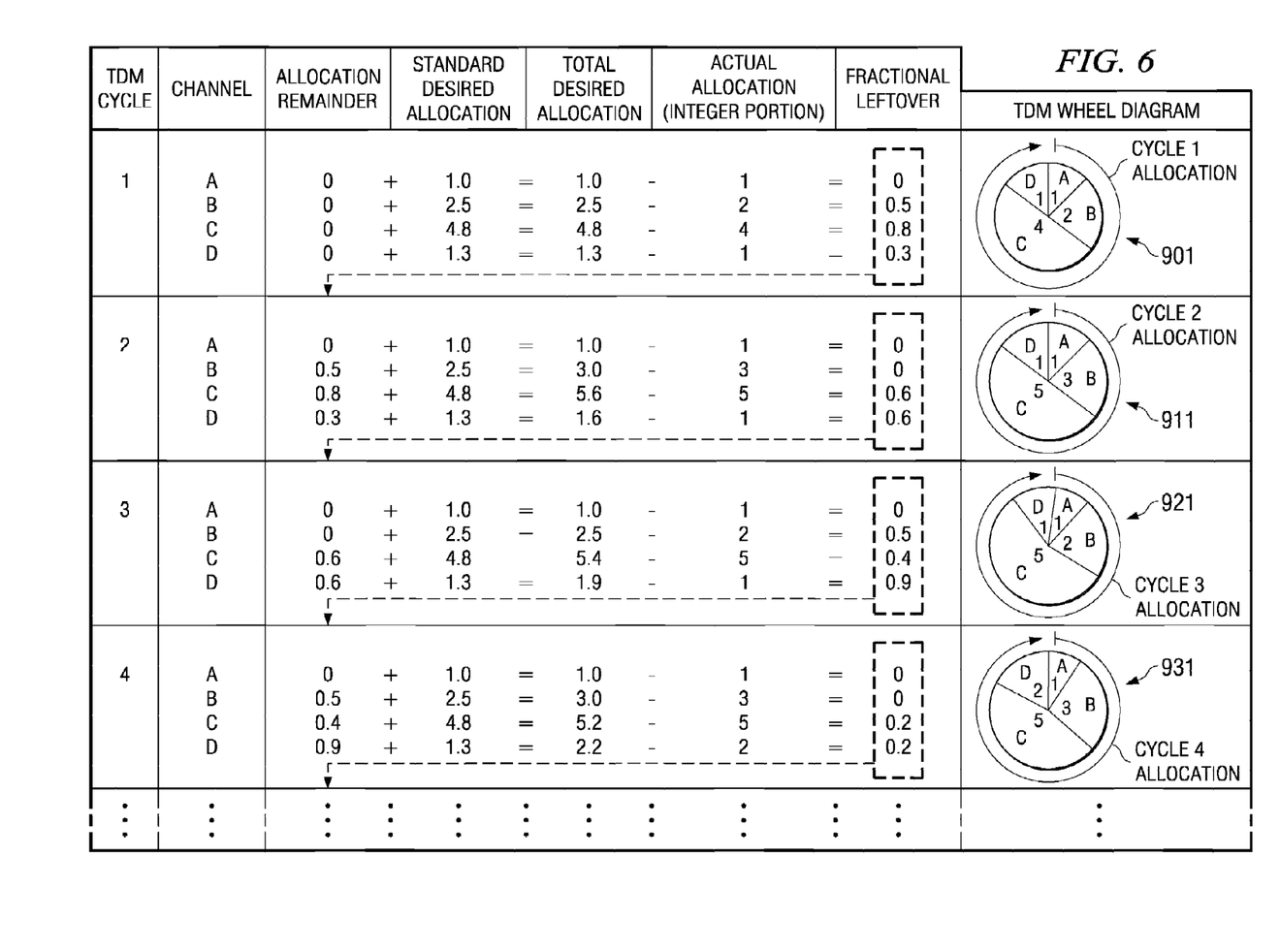
FIG. 6 shows an illustrative example that correlates inter-related charts of the disclosed TDM arbitration technique with the related TDM wheel diagrams for a static example with a fixed number of channels of fixed bandwidth size, providing an example of the first four TDM cycles for an exemplary system with a number of non-integer input channels.

While the examples of FIGS. 4 and 5 have demonstrated the manner in which the disclosed techniques operate for a single channel (out of a multiple channel system), FIG. 6 provides a specific example which illustrates the disclosed techniques operating over a plurality of channels. FIG. 6 provides an example of a four-channel system in which each of the channels varies in size and several channels desire a non-integer number of time slots, showing the manner in which the disclosed techniques may be used to efficiently allocate time slots among the non-integer channels in such a TDM cycle. This example illustrates the process for only the first four cycles, but this introduction provides insight into the inner workings of the technique.

In this example, Channel A desires one time slot (since, for example, its bandwidth has been designed to equal the system's burst size). Channel B has a bandwidth that is 2.5 times as large as Channel A's, so its standard desired allocation would be set as 2.5. Channel C has a bandwidth that is 4.8 times that of Channel A, so its standard desired allocation would be set as 4.8. And Channel D has a bandwidth that is 1.3 times as large as that of Channel A, so that it would have a standard desired allocation of 1.3. These standard desired allocations remain the same from one cycle to the next.

For the first cycle of this example, the allocation remainder for each channel is zero, since there have been no previous cycles that might provide a leftover fractional remainder. Thus, for this example each channel's first allocation remainder would be initialized to zero. Generally, each channel's total desired allocation of time slots can be computed by adding the allocation remainder to the standard desired allocation for each channel. Since the allocation remainder for each channel during the first cycle is zero, however, each channel's total desired allocation of time slots would be equal to the standard desired allocation of time slots during the first cycle.

Because time slots are defined in terms of the system's burst size, a TDM cycle can only allocate an integer number of time slots to a channel. Accordingly, the actual allocation of time slots for each channel would be the integer portion of the total desired allocation. Thus, Channel A would be actually allocated one time slot for the first TDM cycle, Channel B would be actually allocated two time slots, Channel C would be actually allocated four time slots, and Channel D would be actually allocated one time slot. In FIG. 6, the TDM wheel diagram for cycle one allocation 901 illustrates the integer number of time slots actually allocated to each channel for the first TDM cycle. Here, Channel A's allocation would be $1/8^{th}$ of the total available time slots (and thus $1/8^{th}$ of the time interval of the TDM cycle), Channel B's allocation would be $2/8^{th}$ of the total available time slots, Channel C's allocation would be $4/8^{th}$ of the total available time slots, and Channel D's allocation would be $1/8^{th}$ of the total available time slots.

Since only an integer number of time slots can be assigned to a channel, there may be a fractional portion leftover for any channels that do not desire an integer number of time slots. Fractional leftover would be calculated for each channel by subtracting the actual allocation of time slots (which is the integer portion) from the total desired allocation of time slots. So for the first cycle, Channel A's fractional leftover would be zero, Channel B's fractional leftover would be 0.5, Channel C's fractional leftover would be 0.8, and Channel D's fractional leftover would be 0.3. The fractional leftover for each channel from the first cycle would then become the allocation remainder for each channel for the second cycle. In this way, fractional remainders may be addressed by being accumulated back into the desired allocation, until the sum provides for another full (integer) time slot. By rolling the fractional leftover for each channel into the next cycle's desired allocation of time slots, the bandwidth of the single high-speed TDM data stream channel may be efficiently utilized, while each slower speed input channel receives a balanced allocation of time slots that accounts for any fractional amounts in a precise manner.

The second cycle would then begin by summing the allocation remainder for each channel (which represents the fractional leftover for each channel from the preceding cycle) with the standard desired allocation for each channel in order to determine the total desired allocation for each channel. So in this example, Channel A's total desired allocation for the second cycle would be 1.0 (0+1), Channel B's total desired allocation would be 3.0 (0.5+2.5), Channel C's total desired allocation would be 5.6 (0.8+4.8), and Channel D's total desired allocation would be 1.6 (0.3+1.3). By rolling the fractional leftover from the previous cycle into the current cycle's desired time slot allocation, the fractional leftovers can be effectively addressed over time.

Then, the actual allocation of time slots allotted to each channel would be determined based on the integer portion of each channel's total desired allocation. Accordingly, the actual allocation of time slots for Channel A would be 1 (the integer portion of 1.0), the actual allocation of time slots for Channel B would be 3 (the integer portion of 3.0), the actual allocation of time slots for Channel C would be 5 (the integer portion of 5.6), and the actual allocation of time slots for Channel D would be 1 (the integer portion of 1.6). In FIG. 6, the TDM wheel diagram for cycle two allocation 911 illustrates the integer number of time slots allocated to each channel for the second TDM cycle. Here, Channel A's allocation would be $1/10^{th}$ of the total available time slots, Channel B's allocation would be $3/10^{th}$ of the total available time slots, Channel C's allocation would be $5/10^{th}$ of the total available time slots, and Channel D's allocation would be $1/10^{th}$ of the total available time slots.

Again, each channel may have a fractional portion leftover for the second TDM cycle. For each channel, the fractional leftover would be the remainder when the actual allocation for each channel is subtracted from the total desired allocation for each channel. The fractional leftover for each channel from the second cycle would then become the allocation remainder for each channel for the third cycle. In this way, the fractional remainder would be addressed by cyclically cumulating it back into the desired allocation for the next cycle, until the sum provides for an additional time slot. This fractional rollover between cycles minimizes wasted bandwidth space (since a whole time slot is not allocated each cycle to account for a fractional amount), while efficiently providing each channel with an allocation of time slots and accounting for fractional portions. So for the second cycle, Channel A's fractional leftover would be zero (since 1.0−1=0), Channel B's fractional leftover would be zero (since 3.0−3=0), Channel C's fractional leftover would be 0.6 (since 5.6−5=0.6), and Channel D's fractional leftover would be 0.6 (since 1.6−1=0.6).

The third TDM cycle would then begin by summing the allocation remainder for each channel with the standard desired allocation for each channel in order to determine the total desired allocation for each channel. In this example, Channel A's total desired allocation would be 1.0 (0+1), Channel B's total desired allocation would be 2.5 (0+2.5), Channel C's total desired allocation would be 5.4 (0.6+4.8), and Channel D's total desired allocation would be 1.9 (0.6+ 1.3). The actual allocation of time slots allotted to each channel would then be determined based on the integer portion of each channel's total desired allocation. Accordingly, the actual allocation of time slots for Channel A would be 1 (the integer portion of 1.0), the actual allocation of time slots for Channel B would be 2 (the integer portion of 2.5), the actual allocation of time slots for Channel C would be 5 (the integer portion of 5.4), and the actual allocation of time slots for Channel D would be 1 (the integer portion of 1.9). In FIG. 6, the TDM wheel diagram for cycle three allocation 921 illustrates the integer number of time slots allocated to each channel for the third TDM cycle. Here, Channel A's allocation would be $1/9^{th}$ of the total available time slots, Channel B's allocation would be $2/9^{th}$ of the total available time slots, Channel C's allocation would be $5/9^{th}$ of the total available time slots, and Channel D's allocation would be $1/9^{th}$ of the total available time slots.

Again, each channel may have a fractional portion leftover. For each channel, the fractional leftover would be the remainder when the actual allocation for each channel is subtracted from the total desired allocation for each channel. The fractional leftover for each channel from the third cycle would become the allocation remainder for each channel for the fourth cycle. So for the third cycle, Channel A's fractional leftover would be zero (since 1.0−1=0), Channel B's fractional leftover would be 0.5 (since 2.5−2=0.5), Channel C's fractional leftover would be 0.4 (since 5.4−5=0.4), and Channel D's fractional leftover would be 0.9 (since 1.9−1=0.9).

The fourth TDM cycle would once again begin by summing the allocation remainder for each channel with the standard desired allocation for each channel in order to determine the total desired allocation for each channel. In this example, Channel A's total desired allocation would be 1.0 (0+1), Channel B's total desired allocation would be 3.0 (0.5+2.5), Channel C's total desired allocation would be 5.2 (0.4+4.8), and Channel D's total desired allocation would be 2.2 (0.9+1.3). The actual allocation of time slots allotted to each channel would then be determined based on the integer portion of each channel's total desired allocation. Accordingly, the actual allocation of time slots for Channel A would be 1 (the integer portion of 1.0), the actual allocation of time slots for Channel B would be 3 (the integer portion of 3.0), the actual allocation of time slots for Channel C would be 5 (the integer portion of 5.2), and the actual allocation of time slots for Channel D would be 2 (the integer portion of 2.2). In FIG. 6, the TDM wheel diagram for cycle four allocation 931 illustrates the integer number of time slots allocated to each channel for the fourth TDM cycle. Here, Channel A's allocation would be $1/11^{th}$ of the total available time slots, Channel B's allocation would be $3/11^{th}$ of the total available time slots, Channel C's allocation would be $5/11^{th}$ of the total available time slots, and Channel D's allocation would be $2/11^{th}$ of the total available time slots.

Once again, each channel may have a fractional portion leftover. For each channel, the fractional leftover would be the remainder when the actual allocation for each channel is subtracted from the total desired allocation for each channel. The fractional leftover for each channel from the fourth cycle would become the allocation remainder for each channel for the fifth cycle. So for the fourth cycle, Channel A's fractional leftover would be zero (since 1.0−1=0), Channel B's fractional leftover would be zero (since 3.0−3=0), Channel C's fractional leftover would be 0.2 (since 5.2−5=0.2), and Channel D's fractional leftover would be 0.2 (since 2.2−2=0.2).

This same basic procedure would continue indefinitely, summing the allocation remainder (which comes from the fractional leftover of the previous cycle) with the standard desired allocation for each channel in order to calculate the total desired allocation, and then determining the actual number of time slots to allocate to a particular channel based on the integer portion of its total desired allocation. The fractional remainder of each channel for the cycle, calculated by subtracting the actual allocation of time slots (which is the integer portion) from the total desired allocation, would then factor into the next cycle by becoming the allocation remainder for the next cycle. It should be noted that the general term "fractional remainder" refers to the fractional portion of the desired allocation, and corresponds to either the "fractional leftover" or the "allocation remainder." For each cycle, the channels would be granted access to the high-speed TDM data stream using the number of time slots allocated each channel within the TDM cycle.

Using this disclosed technique, bandwidth may be efficiently utilized even though the plurality of channels are of varying size and are not all integer multiples of the system's burst size. The disclosed technique of FIG. 6 essentially uses an averaging process, so that over a number of cycles, the average number of time slots allocated to a particular channel approaches the standard desired allocation. For each channel that is a non-integer multiple, the actual allocation of time slots for a given cycle would vary between the two integers above and below the standard desired allocation, with the frequency depending upon the size of the fractional leftover. Ultimately, the average number of time slots allocated to a particular channel would equal the standard desired allocation on the cycle when the fractional leftover equals zero. Once this occurs, the entire process would start over again and repeat itself.

FIG. 6 provides a snap-shot of a TDM process using the disclosed fractional rollover technique for a particular four channel system. Although only four cycles are shown in this example, the basic techniques are effectively demonstrated so that a person skilled in the art would understand the full operation, especially when viewed in conjunction with the logic diagram of FIG. 4. In addition to demonstrating and illustrating basic procedure, FIG. 6 also reveals that the size of the TDM wheel can change to accommodate the accumulation of fractional leftovers. In other words, the total number of time slots per cycle can change based on the needs of the system. This point is particularly clear when viewing the TDM wheel diagrams for cycles one through four. In the TDM wheel diagram for the first cycle 901, each time slot is $1/8^{th}$ of the total available TDM cycle; while in the second cycle 911, each time slot is $1/10^{th}$ of the total available. Then in the third cycle 921, each time slot is $1/8^{th}$ of the total available, and in the fourth cycle 931 each time slot is $1/11^{th}$ of the total available.

It should be noted that while the exemplary technique described in FIG. 6 may be an effective way to allocate time slots among a plurality of channels, it may be desirable to further limit the number of additional time slots (above those required by the integer portion of each channel's desired allocation) assigned among the plurality of channels per cycle. Whenever a channel receives an additional time slot, the FIFO buffer must be sufficiently large to handle it. Potentially, each channel could receive an additional time slot in a given cycle. This would greatly stress the system's ability to meet performance requirements and/or drive up costs, however. A better approach might then be to limit additional time slot allocation per cycle to one, so that any given TDM cycle would only vary by one time slot at most. This would allow for a more efficient system without excessive FIFO buffer requirements. Any remaining additional time slot allocations (for other channels in the same cycle desiring a number of time slots above their standard desired allocation) might then be delayed, for example. In this way, the size of the TDM cycle would vary by only one time slot across cycles, with additional time slots being spaced out across multiple cycles.

Figure 7:
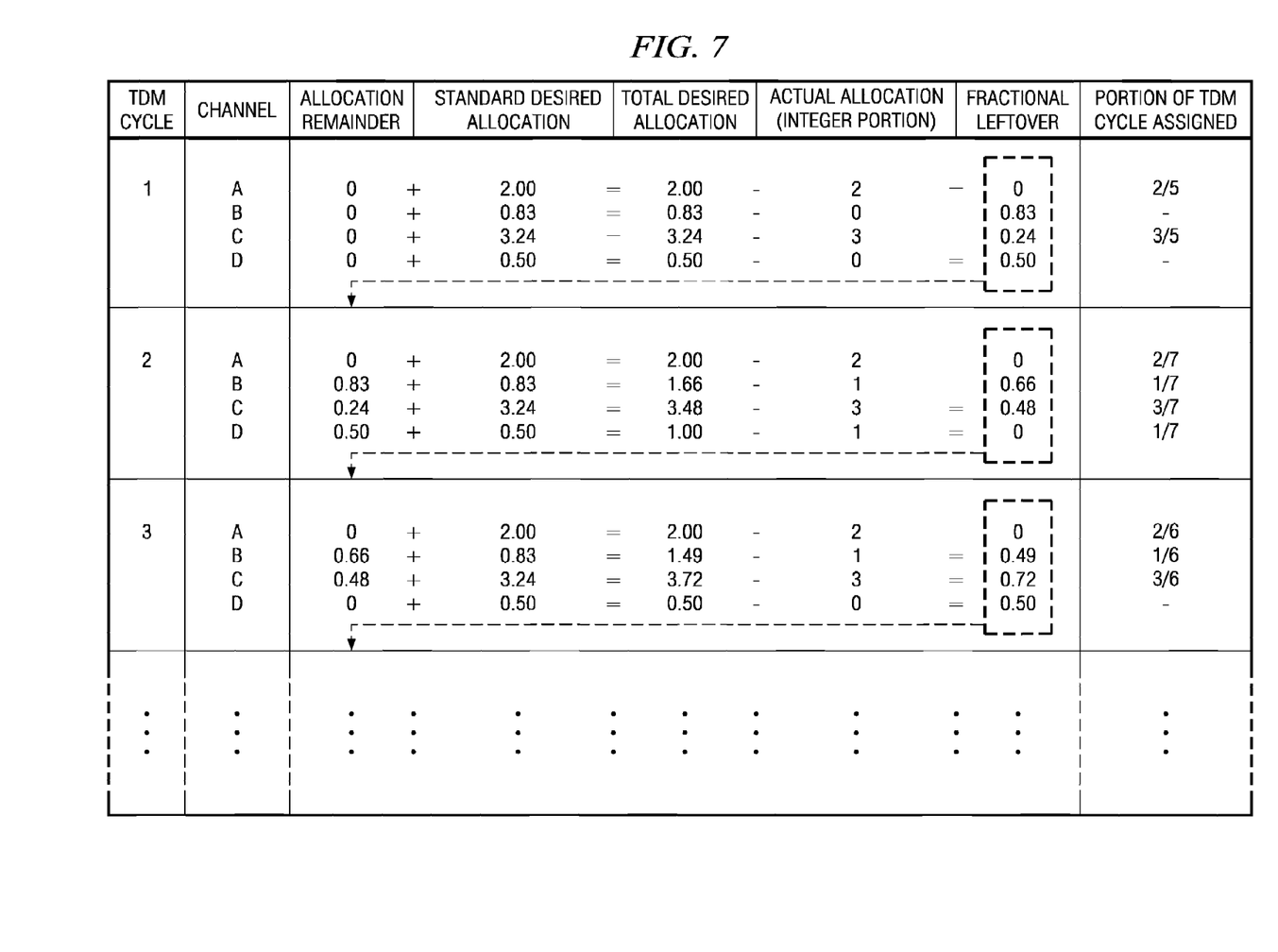
FIG. 7 shows an illustrative example of the first three cycles of a disclosed TDM arbitration technique when the smallest channel desires less than a full time slot and no channel has a bandwidth corresponding to the system's burst size.

A second example, as set forth in FIG. 7, may provide additional insight into disclosed TDM arbitration systems with fractional allocation. This example demonstrates that in the memory access context, it is possible that no channel would have a standard desired allocation of one time slot, and channels may even have standard desired allocations that are less than one (such that they desire only a fraction of a time slot). In the specific example of FIG. 7, Channel A's bandwidth is twice as large as the system's burst size. So in this example, Channel A desires two time slots, having a standard desired allocation of 2. Channel B's bandwidth is actually smaller than the system's burst size, with Channel B having a standard desired allocation of 0.83. Channel C's bandwidth is 3.24 times the system's burst size, so Channel C has a standard desired allocation of 3.24. Channel D's bandwidth is half the system's burst size. Thus Channel D has a standard desired allocation of 0.5.

The example of FIG. 7 illustrates the first three cycles by way of demonstration. For the first cycle of this example, the allocation remainder for each channel is zero, since there have been no previous cycles that might provide a leftover fractional remainder. Thus, for this example each channel's first allocation remainder would be initialized to zero. Generally, each channel's total desired allocation of time slots can be computed by adding the allocation remainder to the standard desired allocation for each channel. Since the allocation remainder for each channel during the first cycle is zero, however, each channel's total desired allocation of time slots would be equal to the standard desired allocation of time slots.

A TDM cycle can only allocate an integer number of time slots to a channel. Accordingly, the actual allocation of time slots for each channel would be the integer portion of the total desired allocation. Thus, Channel A would be actually allocated two time slots for the first TDM cycle, Channel B would be actually allocated no (zero) time slots, Channel C would be actually allocated three time slots, and Channel D would be actually allocated no (zero) time slots. Thus, Channel A's allocation would be $2/5^{th}$ of the total available time slots (and thus $2/5^{th}$ of the time interval of the TDM cycle), Channel C's allocation would be $3/5^{th}$ of the total available time slots, and Channels B and D would not receive any time slots during the first cycle.

Since only an integer number of time slots can be assigned to a channel, there may be a fractional portion leftover for any channels that do not desire an integer number of time slots. Fractional leftover would be calculated for each channel by subtracting the actual allocation of time slots (which is the integer portion) from the total desired allocation of time slots. So for the first cycle, Channel A's fractional leftover would be zero (2−2=0), Channel B's fractional leftover would be 0.83 (0.83−0=0.83), Channel C's fractional leftover would be 0.24 (3.24−3=0.24), and Channel D's fractional leftover would be 0.5 (0.5−0=0.5). The fractional leftover for each channel from the first cycle would then become the allocation remainder for each channel for the second cycle.

The second cycle would then begin by summing the allocation remainder for each channel (which represents the fractional leftover for each channel from the preceding cycle) with the standard desired allocation for each channel in order to determine the total desired allocation for each channel. So in this example, Channel A's total desired allocation for the second cycle would be 2.0 (0+2), Channel B's total desired allocation would be 1.66 (0.83+0.83), Channel C's total desired allocation would be 3.48 (0.24+3.24), and Channel D's total desired allocation would be 1.0 (0.5+0.5).

Then, the actual allocation of time slots allotted to each channel would be determined based on the integer portion of each channel's total desired allocation. Accordingly, the actual allocation of time slots for Channel A would be 2 (the integer portion of 2.0), the actual allocation of time slots for Channel B would be 1 (the integer portion of 1.66), the actual allocation of time slots for Channel C would be 3 (the integer portion of 3.48), and the actual allocation of time slots for Channel D would be 1 (the integer portion of 1.0). Thus, Channel A's allocation would be $2/7^{th}$ of the total available time slots, Channel B's allocation would be $1/7^{th}$ of the total available time slots, Channel C's allocation would be $3/7^{th}$ of the total available time slots, and Channel D's allocation would be $1/7^{th}$ of the total available time slots.

Again, each channel may have a fractional portion leftover for the second TDM cycle. For each channel, the fractional leftover would be the remainder when the actual allocation for each channel is subtracted from the total desired allocation for each channel. The fractional leftover for each channel from the second cycle would then become the allocation remainder for each channel for the third cycle. In this way, the fractional remainder would be addressed by cyclically cumulating it back into the desired allocation for the next cycle, until the sum provides for an additional time slot. So for the second cycle, Channel A's fractional leftover would be zero (since 2.0−2=0), Channel B's fractional leftover would be 0.66 (since 1.66−1=0.66), Channel C's fractional leftover would be 0.48 (since 3.48−3=0.48), and Channel D's fractional leftover would be zero (since 1.0−1=0).

The third TDM cycle of FIG. 7 would then begin by summing the allocation remainder for each channel with the standard desired allocation for each channel in order to determine the total desired allocation for each channel. In this example, Channel A's total desired allocation would be 2.0 (0+2), Channel B's total desired allocation would be 1.49 (0.66+ 0.83), Channel C's total desired allocation would be 3.72 (0.48+3.24), and Channel D's total desired allocation would be 0.5 (0+0.5). The actual allocation of time slots allotted to each channel would then be determined based on the integer portion of each channel's total desired allocation. Accordingly, the actual allocation of time slots for Channel A would be 2 (the integer portion of 2.0), the actual allocation of time slots for Channel B would be 1 (the integer portion of 1.49), the actual allocation of time slots for Channel C would be 3 (the integer portion of 3.72), and the actual allocation of time slots for Channel D would be zero (the integer portion of 0.5). Thus, Channel A's allocation would be $2/6^{th}$ of the total available time slots (and thus $2/6^{th}$ of the TDM cycle time for accessing the high-speed TDM data stream), Channel B's allocation would be $1/6^{th}$ of the total available time slots, Channel C's allocation would be $3/6^{th}$ of the total available time slots, and Channel D would be allocated no time slots this cycle.

Again, each channel may have a fractional portion leftover. For each channel, the fractional leftover would be the remainder when the actual allocation for each channel is subtracted from the total desired allocation for each channel. The fractional leftover for this third cycle would then become the allocation remainder for the fourth cycle. This process would repeat cyclically, granting access to the high-speed TDM data stream to each channel in accordance with the time slots allocated to the channel for a given cycle.

It should be noted that the examples set forth in FIGS. 5, 6, and 7 relate to a static input situation, in which the input channels do not change in number or size. This static situation is only used for illustrative purposes, as the disclosed techniques apply equally well in dynamic systems. In such a dynamic system, numbers that may have been constant in prior examples (such as the standard desired allocation) might have to be recomputed as channels come in and out and/or vary dynamically in size over time. By way of example, if additional channels entered the rotation, the TDM wheel would have to accommodate the new inputs (such that the TDM cycle might change in size). Persons skilled in the art field will appreciate and understand these and other dynamic instances, all of which are included within the scope of this disclosure.

While the specific techniques set forth above in FIGS. 6 and 7 represent a particularly efficient way to allocate time slots in a TDM cycle when one or more of the input channels do not desire an integer number of time slots, there are other possible methods that may effectively address the fractional remainder. For instance, each channel's fractional remainders could be accumulated across multiple TDM cycles using a separate counter, rather than being rolled into the desired allocation amount each cycle, and an additional time slot could be allocated to a particular channel whenever its counter exceeds one. Or, the fractional remainders for each channel could be summed over a set number of cycles, and then an integer number of time slots sufficiently large to address the summed fractional amounts could be allocated to each particular channel, periodically giving a burst of additional time slots.

In some instances, it may be beneficial to limit the total number of additional time slots (in excess of the integer portion of the desired allocation amount for each channel, arising from the cumulative fractional remainders for each channel) that may be allocated across the plurality of channels per cycle. Such a limitation may be based on system design specifications, with additional time slot allocations actually being spread out over multiple cycles in order to ensure a more even distribution of time slots across cycles. So for example, the system could limit the number of additional time slots assigned across all of the channels per cycle to one. This would mean that the TDM cycles could only vary in size by one time slot, with additional time slot allocations actually being spread out over multiple cycles as necessary. All possible methods for handling fractional remainders are intended to be included within the scope of the disclosed techniques. So long as (1) the time slots allocated to each channel per cycle are an integer number equal to or less than the desired allocation (for example, by allocating a number of time slots equal to the integer portion of the total desired allocation), and (2) the fractional remainder is addressed in some manner over the course of the cyclical process, the system will provide for a more efficient use of available bandwidth in the high-speed TDM data stream than does the conventional approach.

While various embodiments in accordance with the principles disclosed herein have been described above, it should be understood that they have been presented by way of example only, and not limitation. Thus, the breadth and scope of the invention(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Field of the Invention," such claims should not be limited by the language chosen under this heading to describe the so-called technical field. Further, a description of a technology in the "Background of the Invention" section is not to be construed as an admission that technology is prior art to any invention(s) in this disclosure. Neither is the "Summary of the Invention" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A method for allocating time slots for time-division multiplex (TDM) cycles associated with a TDM data stream, the time slots being allocated amongst a plurality of channels to be multiplexed onto the TDM data stream, a router performing the method comprising:
   determining each channel's standard desired allocation of time slots, wherein each channel's standard desired allocation of time slots is normalized, with one channel's standard desired allocation being set as an integer number and all other channels' standard desired allocations being set in proportion to the relative size of their bandwidths;
   allocating to each channel a number of time slots equal to the integer portion of the channel's standard desired allocation; and
   rolling a fractional remainder portion of each channel's standard desired allocation over into the next cycle.

2. A method as in claim 1, wherein each channel's standard desired allocation of time slots is determined based on the TDM data stream's burst size and the channel's bandwidth.

3. A method as in claim 2, wherein each channel's standard desired allocation of time slots is determined by dividing the channel's bandwidth by an integer multiple of the TDM data stream's burst size.

4. A method as in claim 1, further comprising:
   accumulating rolled-over fractional remainders for each channel across multiple cycles; and
   allocating additional time slots based on the accumulated rolled-over fractional remainder for each channel.

5. A method as in claim 4, wherein the rolled-over fractional remainder for each channel is accumulated by being added to the standard desired allocation each cycle, such that additional time slots would be allocated to each channel to address the accumulated rolled-over fractional remainder based on the integer portion of the channel's standard desired allocation.

6. A method as in claim 4, wherein only one additional time slot may be actually allocated among the plurality of channels per cycle.

7. A method as in claim 6, wherein any additional time slots accumulated by the plurality of channels in excess of the one additional time slot allocated per cycle would be rolled over into the next cycle.

8. A method as in claim 1, further comprising:
   accumulating rolled-over fractional remainders for each channel across multiple cycles; and
   allocating an additional time slot to any channel whose accumulated rolled-over fractional remainder is greater than or equal to one time slot.

9. A method as in claim 8, further comprising allocating time slots among the plurality of channels on a repeating, rotating basis.

10. A method as in claim 8, wherein the plurality of channels access the TDM data stream, further comprising granting each channel access to the TDM data stream based on allocated time slots.

11. A method as in claim 10, further comprising allocating time slots among the plurality of channels on a repeating, rotating basis.

12. A method as in claim 11, wherein the average number of time slots allocated to each channel per cycle approaches the standard desired allocation across an increasing number of cycles.

13. A method for allocating time slots for time-division multiplex (TDM) cycles associated with a TDM data stream, the time slots being allocated amongst a plurality of channels to be multiplexed onto the TDM data stream, a router performing the method comprising:

determining each channel's standard desired allocation of time slots;

initializing each channel's fractional remainder;

determining the total desired allocation for each channel by adding the fractional remainder to the standard desired allocation;

allocating each channel a number of time slots equal to the integer portion of the channel's total desired allocation; and rolling the fractional remainder portion of each channel's total desired allocation over into the next cycle.

14. A method as in claim 13, further comprising allocating time slots among the plurality of channels on a repeating, rotating basis.

15. A method as in claim 13, wherein the plurality of channels access the TDM data stream, further comprising granting each channel access to the TDM data stream based on allocated time slots.

16. A method as in claim 13, wherein each channel's standard desired allocation of time slots is determined based on the TDM data stream's burst size and the channel's bandwidth.

17. A method as in claim 16, wherein each channel's standard desired allocation of time slots is determined by dividing the channel's bandwidth by an integer multiple of the burst size of the TDM data stream.

18. A method as in claim 16, further comprising allocating time slots among the plurality of channels on a repeating, rotating basis.

19. A method as in claim 18, wherein the plurality of channels access the TDM data stream, further comprising granting each channel access to the TDM data stream based on allocated time slots.

20. A method as in claim 18, wherein the average number of time slots allocated to each channel per cycle approaches the standard desired allocation across an increasing number of cycles.

21. A device comprising:

a plurality of source channels;

a TDM data stream; and a router linking the plurality of channels to the TDM data stream, operable to allocate time slots in a time-division multiplex cycle among the channels in order to coordinate each channel's access to the TDM data stream on a rotating, repeating basis by:

determining each channel's standard desired allocation of time slots, wherein each channel's standard desired allocation of time slots is normalized, with one channel's standard desired allocation being set as an integer number and all other channels' standard desired allocations being set in proportion to the relative size of their bandwidths;

assigning each channel a number of time slots per cycle equal to the integer portion of the channel's standard desired allocation; and rolling a fractional remainder portion of each channel's standard desired allocation over to the next cycle.

22. A device as in claim 21, wherein each channel's standard desired allocation of time slots is determined based on the TDM data stream's burst size and the channel's bandwidth.

23. A device as in claim 21, wherein the means for allocating time slots among the channels further operates by:

accumulating rolled-over fractional remainders for each channel across multiple cycles; and allocating additional time slots based on the accumulated rolled-over fractional remainder for each channel.

24. A device as in claim 23, wherein only one additional time slot may be actually allocated among the plurality of channels per cycle.

25. A device as in claim 24, wherein any additional time slots accumulated by the plurality of channels in excess of the one additional time slot allocated per cycle would be rolled over into the next cycle.

26. A device as in claim 21, wherein the means for allocating time slots among the channels further operates by:

accumulating rolled-over fractional remainders for each channel across multiple cycles; and allocating an additional time slot to any channel whose accumulated rolled-over fractional remainder is greater than or equal to one time slot.

27. A device comprising:

a plurality of source channels;

a TDM data stream; and a router linking the plurality of channels to the TDM data stream, operable to allocate time slots in a time-division multiplex cycle among the channels in order to coordinate each channel's access to the TDM data stream on a rotating, repeating basis by:

determining each channel's standard desired allocation of time slots;

initializing each channel's fractional remainder;

determining the total desired allocation for each channel by adding the fractional remainder to the standard desired allocation;

allocating each channel a number of time slots equal to the integer portion of the channel's total desired allocation;

granting each channel access to the TDM data stream based on allocated time slots; and rolling the fractional remainder portion of each channel's total desired allocation over into the next cycle.

28. A device as in claim 27, wherein each channel's standard desired allocation is determined based on the TDM data stream's burst size and the channel's bandwidth.

29. A device as in claim 27, wherein each channel's standard desired allocation of time slots is determined by dividing the channel's bandwidth by an integer multiple of the TDM data stream's burst size.

* * * * *